US012500963B2

(12) United States Patent
Guo et al.

(10) Patent No.: US 12,500,963 B2
(45) Date of Patent: Dec. 16, 2025

(54) CDN NETWORK REQUEST SCHEDULING METHOD, ELECTRONIC DEVICE, AND STORAGE MEDIUM

(71) Applicant: Beijing Youzhuju Network Technology Co., Ltd., Beijing (CN)

(72) Inventors: Zhiqiang Guo, Beijing (CN); Kaiyu Zheng, Beijing (CN); Xue Liu, Beijing (CN); Jieke Wu, Beijing (CN); Jian Wang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/066,045

(22) Filed: Feb. 27, 2025

(65) Prior Publication Data

US 2025/0202996 A1    Jun. 19, 2025

Related U.S. Application Data

(63) Continuation of application No. PCT/CN2024/074643, filed on Jan. 30, 2024.

(30) Foreign Application Priority Data

Feb. 3, 2023    (CN) .......................... 202310121205.4

(51) Int. Cl.
*H04L 67/63*    (2022.01)
*H04L 45/02*    (2022.01)

(52) U.S. Cl.
CPC .............. *H04L 67/63* (2022.05); *H04L 45/04* (2013.01)

(58) Field of Classification Search
None
See application file for complete search history.

(56) References Cited

U.S. PATENT DOCUMENTS

| | | | | |
|---|---|---|---|---|
| 10,165,080 | B2* | 12/2018 | He | ...................... H04L 61/4511 |
| 2016/0248722 | A1 | 8/2016 | Miki et al. | |
| 2021/0176310 | A1 | 6/2021 | Liang | |

FOREIGN PATENT DOCUMENTS

| | | | | |
|---|---|---|---|---|
| CN | 110572377 A | * | 12/2019 | .......... H04L 61/1511 |
| CN | 110830564 A | * | 2/2020 | .......... H04L 61/1511 |

(Continued)

OTHER PUBLICATIONS

International Search Report and Written Opinion for International Application No. PCT/CN2024/074643, mailed on Apr. 21, 2024, 14 pages.

(Continued)

*Primary Examiner* — Jeffrey R Swearingen
(74) *Attorney, Agent, or Firm* — Astute IP Law Group

(57) ABSTRACT

Disclosed in the present disclosure are a CDN network request scheduling method, an electronic device, and a storage medium. The method includes: obtaining an original network request generated by the client for a target service; obtaining a first domain name rewriting rule corresponding to the target attribution information, and rewriting the original domain name by using the first domain name rewriting rule, to obtain a first domain name; updating the original domain name in the original network request by using the first domain name, to obtain a target network request; and sending the target network request to a target CDN server corresponding to the target CDN service provider identifier, so that the target CDN server obtains a target scheduling path corresponding to the target equipment room identifier, and forwards the target network request to a target equipment room according to the target scheduling path.

20 Claims, 4 Drawing Sheets

(56) References Cited

FOREIGN PATENT DOCUMENTS

| | | |
|---|---|---|
| CN | 111464592 A | 7/2020 |
| CN | 112702425 A | 4/2021 |
| CN | 114531323 A | 5/2022 |
| CN | 116132377 A | 5/2023 |
| CN | 116233127 A | 6/2023 |
| JP | 2005537687 A | 12/2005 |
| JP | 2008533847 A | 8/2008 |
| JP | 2015002378 A | 1/2015 |
| JP | 2018521610 A | 8/2018 |

OTHER PUBLICATIONS

Decision to Grant a Patent for Japanese Patent Application No. 2025-512612, mailed on Oct. 14, 2025, 5 pages.

* cited by examiner

CDN NETWORK REQUEST SCHEDULING METHOD, ELECTRONIC DEVICE, AND STORAGE MEDIUM

CROSS-REFERENCE TO RELATED APPLICATION(S)

This application is a continuation of International Application No. PCT/CN2024/074643, filed on Jan. 30, 2024, which claims priority to and benefits of Chinese Patent Application No. 202310121205.4, filed on Feb. 3, 2023. All of aforementioned patent applications are hereby incorporated by reference in their entireties.

TECHNICAL FIELD

Embodiments of the present disclosure relate to a CDN network request scheduling method and apparatus, an electronic device, and a storage medium.

BACKGROUND

In order to forward traffic from different users to different equipment room units, the following two solutions are currently widely used in the industry. (1) Resolution based on a domain name system (DNS): Different equipment room unit IPs are returned based on geographical locations of the users, and the users in different regions access equipment room units in the corresponding regions by using their IPs. (2) Forwarding and redirection based on an access gateway: Cell-based information is carried in a user request header, and user traffic of a same cell is forwarded or redirected to a corresponding equipment room unit according to a cell mapping rule by providing a traffic allocation service at a traffic entry of each equipment room.

Although in both of the above solutions, the traffic of the users can be forwarded to the different equipment room units, complex service scenario requirements cannot be completely met by using either of them. For example, in solution (1), it cannot be ensured that access requests of the users are allocated to the equipment room units in the corresponding regions; and in solution (2), when a forwarding path passes through a content delivery network (CDN) node, the CDN node does not know how to handle cell-based forwarding, so that the traffic cannot be forwarded to a correct equipment room, and therefore, solution (2) is not applicable to a converged CDN.

SUMMARY

In order to solve or at least partially solve the above technical problems, the present disclosure provides a CDN network request scheduling method and apparatus, an electronic device, and a storage medium.

According to an aspect of embodiments of the present disclosure, a CDN network request scheduling method, which is applied to a client, is provided. The method includes:
obtaining an original network request generated by the client for a target service, where the original network request includes target attribution information corresponding to the client, and an original domain name used to access the target service;
obtaining a first domain name rewriting rule corresponding to the target attribution information, and rewriting the original domain name by using the first domain name rewriting rule, to obtain a first domain name, where the first domain name includes a target CDN service provider identifier and a target equipment room identifier;
updating the original domain name in the original network request by using the first domain name, to obtain a target network request; and
sending the target network request to a target CDN server corresponding to the target CDN service provider identifier, so that the target CDN server obtains a target scheduling path corresponding to the target equipment room identifier, and forwards the target network request to a target equipment room according to the target scheduling path.

According to another aspect of embodiments of the present disclosure, a CDN network request scheduling method, which is applied to a CDN server, is further provided. The method includes:
receiving a target network request from a client, where the target network request includes a first domain name, and the first domain name includes a target equipment room identifier;
determining a target back-to-source address corresponding to the target equipment room identifier based on a correspondence between a preset back-to-source address and an equipment room identifier;
obtaining an access path and a target equipment room that correspond to the target back-to-source address; and
forwarding the target network request to the target equipment room based on the access path.

According to still another aspect of embodiments of the present disclosure, a CDN network request scheduling method, which is applied to a cloud network control system, is further provided. The method includes:
receiving a first query request from a client, where the first query request includes target attribution information corresponding to the client;
obtaining a first domain name rewriting rule corresponding to the target attribution information from a plurality of domain name rewriting rules in response to the first query request, where the domain name rewriting rule is generated based on a first mapping relationship between preset attribution information and an equipment room identifier, a second mapping relationship between the equipment room identifier and a domain name, and a preset traffic percentage; and
sending the first domain name rewriting rule to the client, so that the client performs domain name rewriting based on the first domain name rewriting rule.

According to another aspect of embodiments of the present disclosure, a CDN network request scheduling apparatus is further provided. The apparatus includes:
a first obtaining module configured to obtain an original network request generated by a client for a target service, where the original network request includes target attribution information corresponding to the client, and an original domain name used to access the target service;
a second obtaining module configured to obtain a first domain name rewriting rule corresponding to the target attribution information, and rewrite the original domain name by using the first domain name rewriting rule, to obtain a first domain name, where the first domain name includes a target CDN service provider identifier and a target equipment room identifier;

an update module configured to update the original domain name in the original network request by using the first domain name, to obtain a target network request; and a sending module configured to send the target network request to a target CDN server corresponding to the target CDN service provider identifier, so that the target CDN server obtains a target scheduling path corresponding to the target equipment room identifier, and forwards the target network request to a target equipment room according to the target scheduling path.

According to another aspect of embodiments of the present disclosure, a CDN network request scheduling apparatus is further provided. The apparatus includes:

a receiving module configured to receive a target network request from a client, where the target network request includes a first domain name, and the first domain name includes a target equipment room identifier;

a determining module configured to determine a target back-to-source address corresponding to the target equipment room identifier based on a correspondence between a preset back-to-source address and an equipment room identifier;

an obtaining module configured to obtain an access path and a target equipment room that correspond to the target back-to-source address; and a forwarding module configured to forward the target network request to the target equipment room based on the access path.

According to another aspect of embodiments of the present disclosure, a CDN network request scheduling apparatus is further provided. The apparatus includes:

a receiving module configured to receive a query request from a client, where the query request includes target attribution information corresponding to the client;

a response module configured to obtain a first domain name rewriting rule corresponding to the target attribution information from a plurality of domain name rewriting rules in response to the query request, wherein the domain name rewriting rule is generated based on a first mapping relationship between preset attribution information and an equipment room identifier, a second mapping relationship between the equipment room identifier and a domain name, and a preset traffic percentage; and a sending module configured to send the first domain name rewriting rule to the client, so that the client performs domain name rewriting based on the first domain name rewriting rule.

According to another aspect of embodiments of the present disclosure, a storage medium is further provided. The storage medium includes a stored program. When the program is run, the above steps are performed.

According to another aspect of embodiments of the present disclosure, an electronic apparatus is further provided. The electronic apparatus includes a processor, a communication interface, a memory, and a communication bus. The processor, the communication interface, and the memory communicate with each other through the communication bus. The memory is configured to store a computer program. The processor is configured to perform the steps of the above method by running the program stored in the memory.

An embodiment of the present disclosure further provides a computer program product including instructions. The computer program product, when run on a computer, causes the computer to perform the steps of the above method.

BRIEF DESCRIPTION OF DRAWINGS

The accompanying drawings herein, which are incorporated into and form a part of the description, illustrate the embodiments in line with the present disclosure and are used in conjunction with the description to explain the principles of the present disclosure.

In order to more clearly illustrate the technical solutions in the embodiments of the present disclosure or in the prior art, the accompanying drawings for describing the embodiments or the prior art will be briefly described below. Apparently, those of ordinary skill in the art may still derive other drawings from these accompanying drawings without creative efforts.

DETAILED DESCRIPTION

To make the objectives, technical solutions and advantages of embodiments of the present disclosure clearer, the technical solutions in the embodiments of the present disclosure will be described clearly and completely below with reference to the accompanying drawings in the embodiments of the present disclosure. Apparently, the embodiments described are some rather than all of the embodiments of the present disclosure. The illustrative embodiments of the present disclosure and the description thereof are used to explain the present disclosure and do not constitute improper limitations on the present disclosure. All other embodiments obtained by those of ordinary skill in the art based on the embodiments of the present disclosure without creative efforts shall fall within the scope of protection of the present disclosure.

It should be noted that, herein, relative terms such as "first" and "second" are only used to distinguish one entity or operation from another similar entity or operation, and do not necessarily require or imply that such an actual relationship or order exists between these entities or operations.

Moreover, the terms "include" and "include", or any of their variants are intended to cover a non-exclusive inclusion, so that a process, method, article, or device that includes a list of elements not only includes those elements but also includes other elements that are not expressly listed, or further includes elements inherent to such process, method, article, or device. In the absence of more restrictions, an element defined by "including a . . . " does not exclude another identical element in a process, method, article, or device that includes the element.

The embodiments of the present disclosure provide a CDN network request scheduling method and apparatus, an electronic device, and a storage medium. The method provided in the embodiments of the present disclosure may be applied to any desired electronic device which, for example, may be an electronic device such as a server and a terminal. This is not specifically limited herein. The desired electronic device is referred to as an electronic device hereinafter for ease of description.

Figure 1:
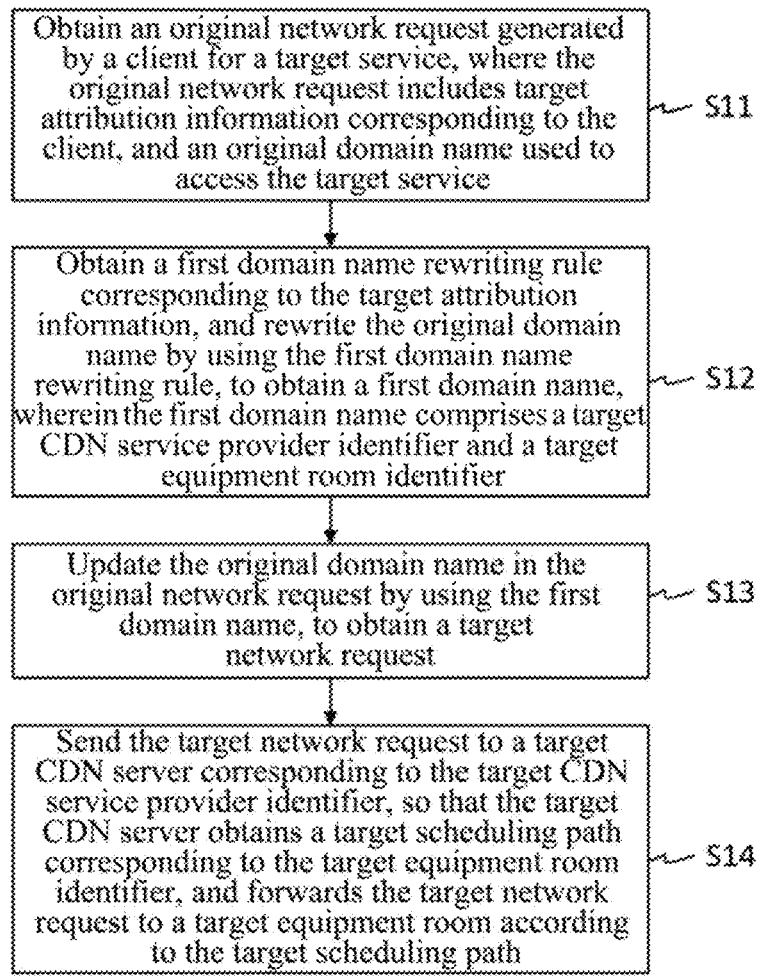
FIG. 1 is a flowchart of a CDN network request scheduling method according to an embodiment of the present disclosure.

According to an aspect of the embodiments of the present disclosure, a method embodiment of a CDN network request scheduling method is provided. FIG. 1 is a flowchart of a CDN network request scheduling method according to an embodiment of the present disclosure. As shown in FIG. 1, the method includes the following steps.

Step S11: Obtain an original network request generated by a client for a target service, where the original network request includes target attribution information corresponding to the client, and an original domain name used to access the target service.

The method provided in this embodiment of the present disclosure is applied to the client. When a user needs to access a service through the client, the client first obtains current target attribution information; then, the client determines the target service to be accessed, and obtains the original domain name used to access the target service, for example, the target service that the client currently wants to access is X, and the original domain name is X-aaa.com; and finally, the client generates the original network request based on the original domain name and the target attribution information.

It should be noted that the target attribution information is determined based on a current state of the client. When the client is currently in a state of being installed but not registered, the target attribution information is client attribution information. The client attribution information may be generated based on an installation environment of the client, and operator information. When the client is currently in a state of being registered but not logged in, the target attribution information is device attribution information of a device to which the client belongs. The device attribution information may be generated based on device information and the operator information. When the client is currently in a logged-in state, the target attribution information is the client attribution information. The client attribution information may be account information of an account registered by the user. A priority of user attribution information is higher than that of the device attribution information, and the priority of the device attribution information is higher than that of the client attribution information. A process of obtaining each piece of attribution information is as follows.

(1) After the client is installed, a server allocates the client attribution information (i.e., app_local) for the client based on the installation environment of the client, and the operator environment.

(2) After being installed, the client initiates a device registration request based on a preset access policy, where the device registration request carries the client attribution information and the device information that may be a device serial number, etc.

(3) After receiving the device registration request sent by the client, the server determines whether the server itself matches the client attribution information. If the server matches the client attribution information, the server further determines whether the device to which the client belongs is a registered device. If the device to which the client belongs is a registered device, the device attribution information is fed back to the client. If the device to which the client belongs is an unregistered device, the device attribution information of the device to which the client belongs is registered based on the device information, and the device attribution information is fed back to the client.

For example, the client attribution information is a location A, and a location where the device registration request is initiated is also the location A. In this example, after the client is installed, the client initiates, based on the preset access policy, the device registration request to a server A corresponding to the location A, and after the server A confirms that the client attribution information matches the server A itself, the server A feeds back the device attribution information to the client.

(4) When the server determines that the server itself does not match the client attribution information, the server queries an access address of a home server corresponding to the client attribution information and sends the access address to the client. The client resends the device registration request to the home server through the access address. The home server further determines whether the device to which the client belongs is a registered device. If the device to which the client belongs is a registered device, the device attribution information and a device identifier (device ID) are fed back to the client. If the device to which the client belongs is an unregistered device, the device attribution information and the device identifier (device ID) of the device to which the client belongs are registered based on the device information, and the device attribution information and the device identifier (device ID) are fed back to the client.

For example, the client attribution information is a location A, and a location where the device registration request is initiated is a location B. In this example, after the client is installed, the client initiates, based on the preset access policy, the device registration request to a server B corresponding to the location B, and after the server B confirms that the client attribution information does not match the server B itself, the server B feeds back an access address of a home server A to the client. The client re-initiates a device registration request to the server A based on the access address, and after confirming that the client attribution information matches the server A itself, the server A feeds back the device attribution information and the device identifier (device ID) to the client.

(5) After obtaining the device attribution information, the client may send an account registration request to the server through an account registration operation triggered by a user on the client, where the account registration request carries user identity information, etc. The server may generate account attribution information based on the user identity information, and feeds back the account attribution information to the client.

Step S12: Obtain a first domain name rewriting rule corresponding to the target attribution information, and rewrite the original domain name according to the first domain name rewriting rule, to obtain a first domain name, where the first domain name includes a target CDN service provider identifier and a target equipment room identifier.

In the embodiment of the present disclosure, obtaining the first domain name rewriting rule corresponding to the target attribution information may be obtaining the first domain name rewriting rule corresponding to the target attribution information directly from domain name rewriting rules stored locally on the client. It should be noted that the domain name rewriting rule stored locally on the client is obtained by the client sending a query request to a cloud network control system based on a preset query mechanism, and the domain name rewriting rule is generated by the cloud network control system based on a first mapping relationship between preset attribution information and an equipment room identifier, a second mapping relationship between the equipment room identifier and a domain name, and a preset traffic percentage. The preset query mechanism may be a periodic query or a query performed when the attribution information is updated.

Specifically, a process in which the client obtains the domain name rewriting rule is as follows.

Step A1: Generate a first query request based on a preset query mechanism, where the first query request carries the target attribution information of the client.

In the embodiment of the present disclosure, generating a first query request based on the preset query mechanism includes the following steps A101 and A102.

Step A101: Detect whether the target attribution information is updated relative to initial attribution information, to obtain a detection result, where the initial attribution information is attribution information stored by the client before the original network request is received.

In the embodiment of the present disclosure, it is detected whether the target attribution information is updated relative to the initial attribution information. For example, the client is in a non-logged-in state before the original network request is received, and the corresponding initial attribution information is the device attribution information. Then, after receiving the original network request, the client detects the target attribution information carried in the original network request. If the target attribution information is the user attribution information, it is determined that the target attribution information is updated relative to the initial attribution information. In this case, the detection result indicates that the client currently changes from the non-logged-in state to a logged-in state. If the target attribution information is the device attribution information, it is determined that the target attribution information is not updated relative to the initial attribution information. In this case, the detection result indicates that the client is still in the non-logged-in state.

Step A102: Generate the first query request based on a request generation policy corresponding to the detection result.

In the embodiment of the present disclosure, generating the first query request based on the request generation policy corresponding to the detection result includes: when the detection result is that the target attribution information is not updated relative to the initial attribution information, obtaining a preset time interval, and generating the first query request based on the preset time interval and the target attribution information, that is, in the embodiment of the present disclosure, if the detection result is that the target attribution information is not updated relative to the initial attribution information, the client may generate the first query request based on the preset time interval and the target attribution information, so as to periodically generate the query request;

or when the detection result is that the target attribution information is updated relative to the initial attribution information, generating the first query request based on the target attribution information.

In the embodiment of the present disclosure, if the detection result is that the target attribution information is updated relative to the initial attribution information, the client does not need to generate the query request based on the preset time interval, but can directly generate the first query request based on the target attribution information. Specifically, the client invokes a Passport service to perform login verification. The Passport service queries the target attribution information (since the client is currently in the logged-in state, the target attribution information is the user attribution information), and the Passport service requests generation of the first query request based on the target attribution information.

Step A2: Send the first query request to the cloud network control system, so that the cloud network control system obtains the first domain name rewriting rule that matches the target attribution information from a plurality of domain name rewriting rules, and sends the first domain name rewriting rule to the client, where the domain name rewriting rule is generated based on the first mapping relationship between the preset attribution information and the equipment room identifier, the second mapping relationship between the equipment room identifier and the domain name, and the preset traffic percentage.

Step A3: Receive the first domain name rewriting rule sent by the cloud network control system, and store the first domain name rewriting rule.

According to the method provided in the embodiment of the present disclosure, the query request is sent to the cloud network control system through different query mechanisms, so that the client can obtain a latest domain name rewriting rule in different scenarios.

In the embodiment of the present disclosure, the step S12 of rewriting the original domain name according to the first domain name rewriting rule, to obtain a first domain name includes the following steps B1 and B2.

Step B1: Obtain a target equipment room identifier corresponding to the target attribution information from the first mapping relationship, and obtain a candidate domain name corresponding to the target equipment room identifier from the second mapping relationship.

In the embodiment of the present disclosure, the first mapping relationship includes:

store_region_$uid$=CD→CD_unit; and store_region_$uid$=AB→AB_unit.

The above store_region_uid=CD and store_region_uid=AB are the preset attribution information, and CD_unit and AB_unit are equipment room identifiers. On this basis, the target equipment room identifier having a mapping relationship with the target attribution information may be obtained from the first mapping relationship by using the target attribution information. Then, the candidate domain name corresponding to the target equipment room identifier is obtained from the second mapping relationship by using the target equipment room identifier. The second mapping relationship includes:

(CD_unit,serviceX primary domain name)→
[A_CD_X.com,B_CD_X.com];

(AB_unit,serviceX primary domain name)→
[A_AB_X.com,B_AB_X.com];

(CD_unit,serviceY primary domain name)→
[A_CD_Y.com,B_CD_Y.com]; and (AB_unit,serviceY primary domain name)→
[A_AB_X.com,B_AB_X.com].

The above A_CD_X.com, B_CD_X.com, and A_CD_Y.com, B_CD_Y.com are all domain names. For example, the target equipment room identifier is CD_unit, and the candidate domain names corresponding to the target equipment room identifier are A_CD_X.com and B_CD_X.com, where A and B are CDN service provider identifiers of a CDN server.

Step B2: Obtain the preset traffic percentage, and determine a candidate domain name that matches the preset traffic percentage as the first domain name.

In the embodiment of the present disclosure, the preset traffic percentage includes: a cloud converged CDN traffic percentage and an equipment room traffic percentage. A preset range is determined based on the preset traffic percentage. For example, [1-40] corresponds to a CDN service provider identifier A, and [41-100] corresponds to a CDN service provider identifier B. Then, a modulo operation is performed by using a device identifier of the device to which the client belongs, to obtain an operation result, a preset range within which the operation result falls is determined, a CDN service provider identifier corresponding to the range is used as the target CDN service provider identifier, and a candidate domain name carrying the target CDN service provider identifier is determined as the first domain name.

As an example, the target equipment room identifier is CD_unit, and candidate domain names corresponding to the target equipment room identifier are A_CD_X.com and B_CD_X.com. In this case, the operation result obtained after the modulo operation is performed on the device identifier is 32, which falls within the range [1-40]. On this basis, the CDN service provider identifier A corresponding to [1-40] is used as the target CDN service provider identifier, and the candidate domain name "A_CD_X.com" carries the CDN service provider identifier A, and thus A_CD_X.com is the first domain name finally obtained.

Step S13: Update the original domain name in the original network request by using the first domain name, to obtain a target network request.

In the embodiment of the present disclosure, after obtaining the rewritten first domain name, the client replaces the original domain name in the original network request with the first domain name, to obtain the target network request.

It should be noted that the client rewrites the original domain name in the network request into a target domain name carrying the CDN service provider identifier and the equipment room identifier based on the domain name rewriting rule of the target attribution information, and then carries the first domain name in the target network request. In this way, after the target network request is sent to the server, the server can schedule the network request to a correct equipment room by using the equipment room identifier.

Step S14: Send the target network request to a target CDN server corresponding to the target CDN service provider identifier, so that the target CDN server obtains a target scheduling path corresponding to the target equipment room identifier, and forwards the target network request to a target equipment room according to the target scheduling path.

In the embodiment of the present disclosure, the first domain name in the target network request carries the target CDN service provider identifier and the target equipment room identifier, on this basis, the client first sends the target network request to a service access layer, and the service access layer forwards the target network request to the target CDN server based on the target CDN service provider identifier. The target CDN server selects the target scheduling path corresponding to the target equipment room identifier, and forwards the target network request to the target equipment room according to the target scheduling path.

Figure 2:
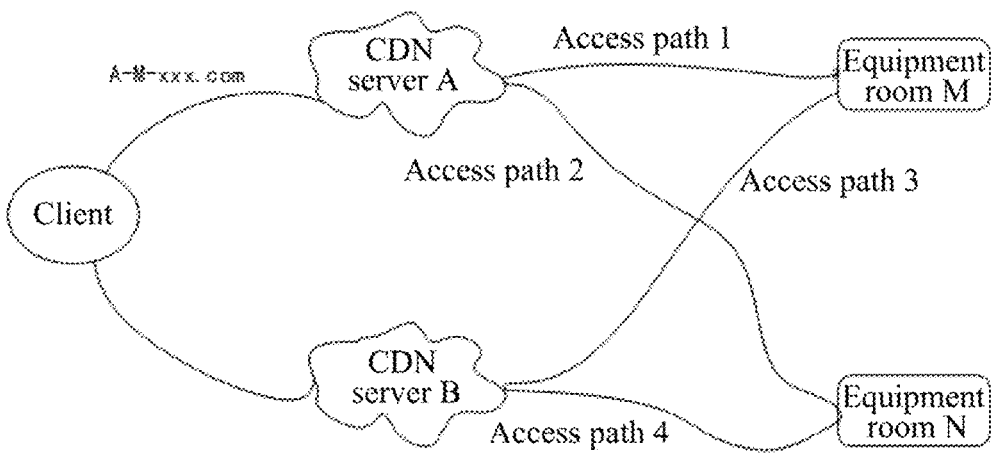
FIG. 2 is a schematic diagram of a network request scheduling process according to an embodiment of the present disclosure.

As an example, as shown in FIG. 2, the first domain name carried in the target network request sent by the client is A-M-xxx.com, where A is the target CDN service provider identifier, and M is the target equipment room identifier. The client forwards the target network request to a CDN server A through the service access layer, and the CDN server A determines a target back-to-source address corresponding to M based on a pre-configured correspondence between a back-to-source address and an equipment room identifier, determines an access path and a target equipment room based on the target back-to-source address, and finally sends the target network request to a target equipment room M through the access path.

According to the method provided in the embodiment of the present disclosure, the client rewrites the original domain name in the network request into the target domain name carrying the CDN service provider identifier and the equipment room identifier according to the domain name rewriting rule of the target attribution information, carries the target domain name in the network request, and sends the network request, thereby achieving accurate scheduling for different network requests in different regions, avoiding a problem of scheduling errors or scheduling failures due to the CDN server being unable to know a forwarding address compared with the prior art, and thus, better adapting to CDN usage scenarios.

Figure 3:
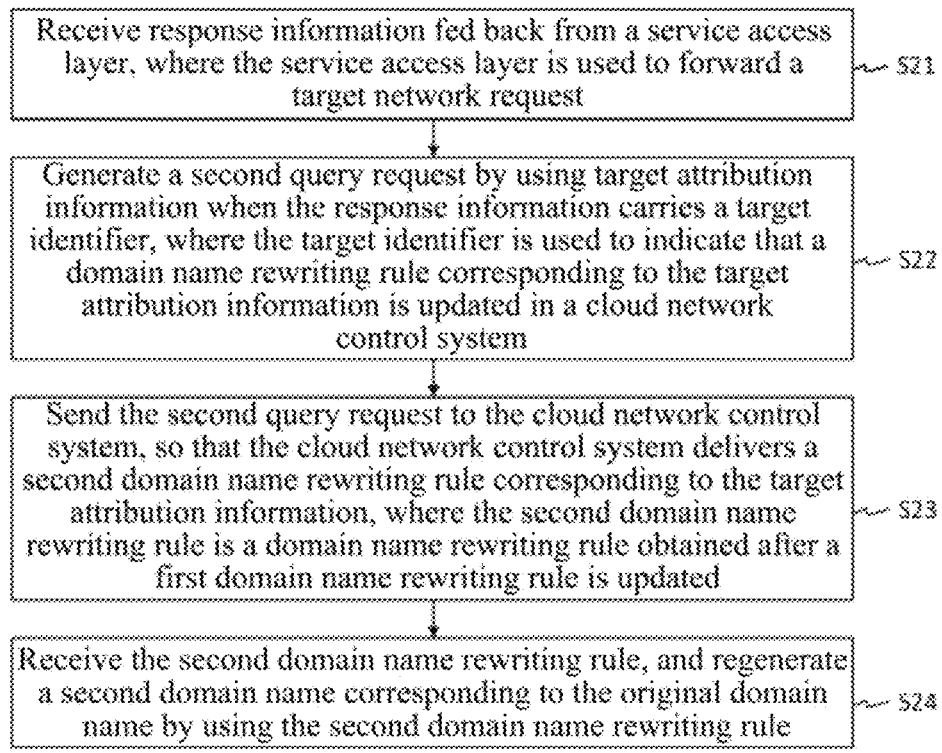
FIG. 3 is a flowchart of a CDN network request scheduling method according to another embodiment of the present disclosure.

In an embodiment of the present disclosure, after the sending the target network request to a target CDN server corresponding to the first domain name, as shown in FIG. 3, the method further includes the following steps.

Step S21: Receive response information fed back from the service access layer, where the service access layer is used to forward the target network request.

In the embodiment of the present disclosure, when sending the target network request, the client first sends the target network request to the service access layer, and the service access layer determines, by using probe information stored in itself, whether the domain name rewriting rule corresponding to the target attribution information of the client is updated, and delivers response information carrying the target identifier to the client if the domain name rewriting rule corresponding to the target attribution information of the client is updated. It should be noted that the probe information of the service access layer is delivered after the domain name rewriting rule in the cloud network control system is updated.

As an example, the domain name rewriting rule in the cloud network control system includes: a domain name rewriting rule P1 of attribution information Q1, a domain name rewriting rule P2 of attribution information Q2, and a domain name rewriting rule P3 of attribution information Q3. An updated domain name rewriting rule includes: a domain name rewriting rule P1' of the attribution information Q1 and a domain name rewriting rule P2' of the attribution information Q2. In this case, the probe information delivered to the service access layer includes: the attribution information Q1 and the attribution information Q2. If the target attribution information in the target network request hits attribution information in the probe information, it is determined that the domain name rewriting rule corresponding to the target attribution information is updated. In this case, the response information is fed back to the client, and the response information carries the target identifier that is used to indicate that the domain name rewriting rule corresponding to the target attribution information is updated in the cloud network control system. On the contrary, if the target attribution information in the target network request does not hit attribution information in the probe information, it is determined that the domain name rewriting rule corresponding to the target attribution information is not updated. In this case, the response information is normally fed back to the client, and the response information does not carry the target identifier.

Step S22: Generate a second query request by using the target attribution information when the response information carries the target identifier, where the target identifier is used to indicate that the domain name rewriting rule corresponding to the target attribution information is updated in the cloud network control system.

In the embodiment of the present disclosure, after receiving the response information, the client determines whether the response information carries the target identifier, so as to determine whether the domain name rewriting rule corresponding to the target attribution information is updated.

In the embodiment of the present disclosure, when the response information carries the target identifier, the client generates the second query request by using the target attribution information, so as to obtain the updated domain name rewriting rule.

Step S23: Send the second query request to the cloud network control system, so that the cloud network control system delivers a second domain name rewriting rule corresponding to the target attribution information, where the second domain name rewriting rule is a domain name rewriting rule obtained after the first domain name rewriting rule is updated.

In the embodiment of the present disclosure, the client sends the second query request to the cloud network control system, and the cloud network control system queries an updated second domain name rewriting rule corresponding to the target attribution information based on the target attribution information in the second query request.

Step S24: Receive the second domain name rewriting rule, and regenerate a second domain name corresponding to the original domain name according to the second domain name rewriting rule.

In the embodiment of the present disclosure, after receiving the second domain name rewriting rule fed back by the cloud network control system, the client regenerates the second domain name corresponding to the original domain name according to the second domain name rewriting rule, and carries the second domain name in the original network request, to obtain a new network request. Finally, the new network request is sent to a server corresponding to a CDN service provider identifier carried in the second domain name, so that the server selects a corresponding access path based on an equipment room identifier carried in the second domain name, and sends the new network request to an equipment room corresponding to the equipment room identifier through the access path.

According to the method provided in the embodiment of the present disclosure, when the domain name rewriting rule of the cloud network control system is updated, it is determined whether the attribution information carried in the current network request is updated by using the probe information of the service access layer, thereby implementing synchronous configuration of the domain name rewriting rule, and preventing occurrence of an error in forwarding the network request.

Figure 4:
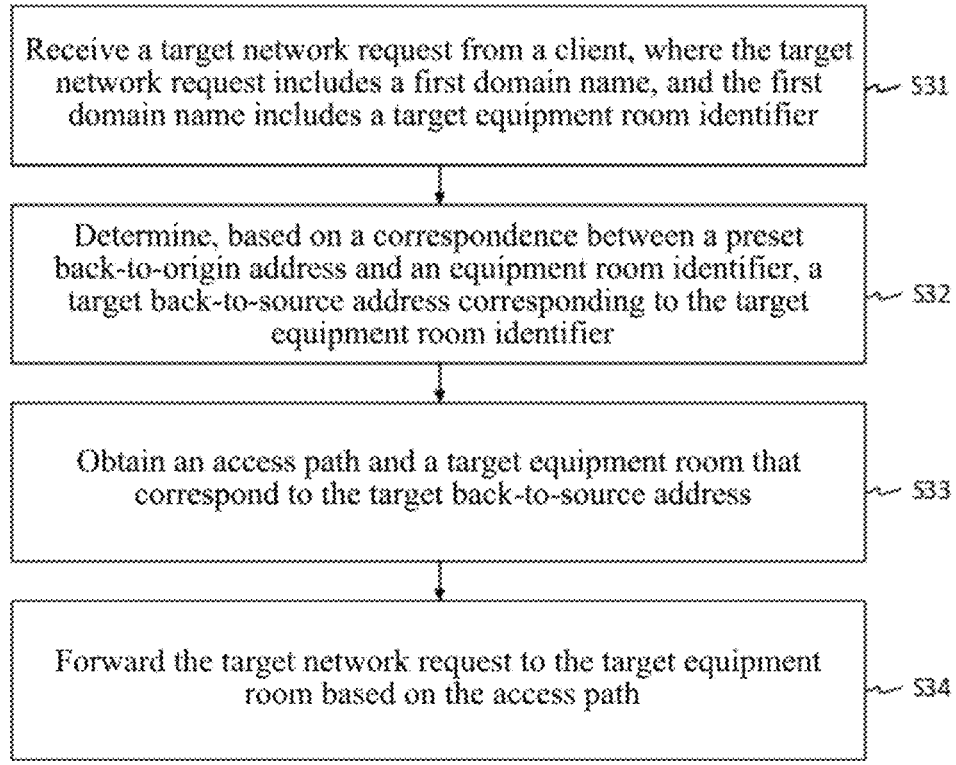
FIG. 4 is a flowchart of a CDN network request scheduling method according to another embodiment of the present disclosure.

According to another aspect of the embodiments of the present disclosure, a CDN network request scheduling method is further provided. FIG. 4 is a flowchart of a CDN network request scheduling method according to an embodiment of the present disclosure. As shown in FIG. 4, the method may include the following steps.

Step S31: Receive a target network request from a client, where the target network request includes a first domain name, and the first domain name includes a target equipment room identifier.

Step S32: Determine a target back-to-source address corresponding to the target equipment room identifier based on a correspondence between a preset back-to-source address and an equipment room identifier.

Step S33: Obtain an access path and a target equipment room that correspond to the target back-to-source address.

Step S34: Forward the target network request to the target equipment room based on the access path.

The method provided in this embodiment of the present disclosure is applied to a CDN server. After receiving the target network request sent by the client, the CDN server first extracts the first domain name from the target network request. The first domain name includes a target CDN service provider identifier (i.e., a CDN service provider identifier of a current CDN server) and the target equipment room identifier. Then, the target back-to-source address that matches the target equipment room identifier is queried from a pre-configured correspondence between the preset back-to-source addresses and the equipment room identifier. Specifically, the CDN server may first obtain a correspondence between a domain name and a back-to-source address, for example, A_AB_X.com:AB_unit.com, and then, based on the correspondence, determine the preset back-to-source address and the equipment room identifier, that is, AB:AB_unit.com. In this case, the target back-to-source address is determined as: AB_unit.com.

In the embodiment of the present disclosure, after determining the target back-to-source address, the CDN server obtains the access path and the target equipment room that correspond to the target back-to-source address, and finally forwards the target network request to the target equipment room based on the access path.

Figure 5:
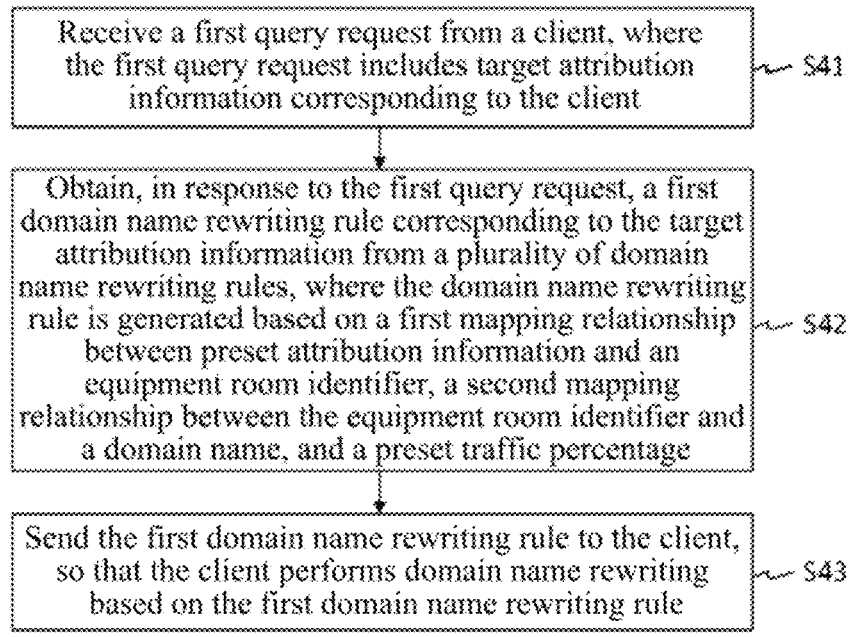
FIG. 5 is a flowchart of a CDN network request scheduling method according to another embodiment of the present disclosure.

According to another aspect of the embodiments of the present disclosure, a CDN network request scheduling method is further provided. FIG. 5 is a flowchart of a CDN network request scheduling method according to an embodiment of the present disclosure. As shown in FIG. 5, the method may include the following steps.

Step S41: Receive a first query request from a client, where the first query request includes target attribution information corresponding to the client.

The method provided in this embodiment of the present disclosure is applied to a cloud network control system. The first query request received by the cloud network control system is generated by the client based on a preset query mechanism, where the preset query mechanism may be a periodic query or a query performed when attribution information is updated. The first query request carries the target attribution information corresponding to the client.

Step S42: Obtain a first domain name rewriting rule corresponding to the target attribution information from a plurality of domain name rewriting rules in response to the first query request, where the domain name rewriting rule is generated based on a first mapping relationship between preset attribution information and an equipment room identifier, a second mapping relationship between the equipment room identifier and a domain name, and a preset traffic percentage.

In the embodiment of the present disclosure, the cloud network control system obtains the first domain name rewriting rule corresponding to the target attribute information from the plurality of domain name rewriting rules in response to the first query request, where the domain name rewriting rule in the cloud network control system is generated based on the first mapping relationship between the preset attribution information and the equipment room identifier, for example, store_region_uid=CD→CD_unit, etc., the second mapping relationship between the equipment room identifier and the domain name, for example, (CD_unit, service X primary domain name)→[A_CD_X-.com, B_CD_X.com], etc., and the preset traffic percentage, which are pre-configured. Specifically, the cloud network control system receives configuration information uploaded by an administrator, and parses the configuration information to obtain the first mapping relationship between the preset attribution information and the equipment room identifier, and the second mapping relationship between the equipment room identifier and the domain name. Then, the cloud network control system obtains a traffic percentage control policy uploaded by the administrator, and determines the preset traffic percentage based on the traffic percentage control policy. For example, in a case of currently including a CDN server A and a CDN server B, traffic sent to the CDN server A accounts for 40%, and traffic sent to the CDN server B accounts for 60%. Finally, the domain name rewriting rule is generated based on the first mapping relationship, the second mapping relationship, and the preset traffic percentage.

Step S43: Send the first domain name rewriting rule to the client, so that the client performs domain name rewriting based on the first domain name rewriting rule.

In the embodiment of the present disclosure, the cloud network control system sends the first domain name rewriting rule to the client, and after receiving the first domain name rewriting rule, the client stores the first domain name rewriting rule locally, and performs domain name rewriting by using the first domain name rewriting rule.

In the embodiment of the present disclosure, the method further includes the following steps C1 to C4.

Step C1: Obtain update information acting on the domain name rewriting rule, and update the domain name rewriting rule based on the update information, to obtain an updated domain name rewriting rule.

In the embodiment of the present application, when the administrator needs to update the domain name rewriting rule, the cloud network control system may further obtain the update information uploaded by the administrator, and update the domain name rewriting rule based on the update information, to obtain the updated domain name rewriting rule. For example, the first mapping relationship, the second mapping relationship, and/or the preset traffic percentage in the domain name rewriting rule are updated.

Step C2: Generate probe information based on the updated domain name rewriting rule, and send the probe information to a service access layer, so that when receiving a target network request sent by the client, the service access layer determines, based on the probe information, whether a domain name rewriting rule corresponding to the target attribution information of the client is updated, and delivers response information carrying a target identifier to the client when the domain name rewriting rule corresponding to the target attribution information of the client is updated.

Step C3: Receive a second query request sent by the client, where the second query request carries the target attribution information.

Step C4: Obtain a second domain name rewriting rule corresponding to the target attribution information from the updated domain name rewriting rule by using the target attribution information, and send the second domain name rewriting rule to the client.

In the embodiment of the present disclosure, since the response information carries the target identifier, the client generates the second query request by using the target attribution information based on the target identifier, and the cloud network control system obtains the second domain name rewriting rule corresponding to the target attribution information from the updated domain name rewriting rule by using the target attribution information, and sends the second domain name rewriting rule to the client. Then, after receiving the second domain name rewriting rule fed back by the cloud network control system, the client regenerates the second domain name corresponding to an original domain name by using the second domain name rewriting rule, and carries the second domain name in an original network request, to obtain a new network request. Finally, the new network request is sent to a server corresponding to a CDN service provider identifier carried in the second domain name.

Figure 6:
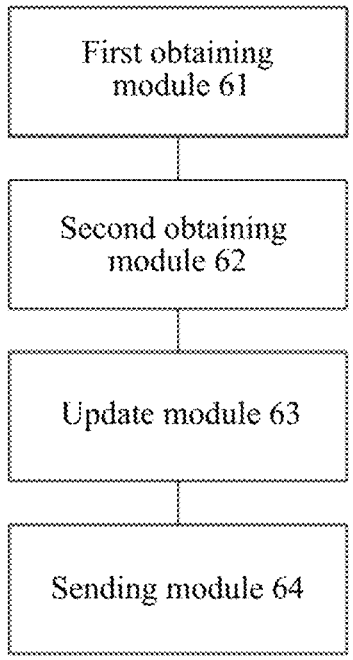
FIG. 6 is a block diagram of a CDN network request scheduling apparatus according to an embodiment of the present disclosure.

FIG. 6 is a block diagram of a CDN network request scheduling apparatus according to an embodiment of the present disclosure. The apparatus may be implemented as a part or an entirety of an electronic device by means of software, hardware, or a combination thereof. As shown in FIG. 6, the apparatus includes:

a first obtaining module 61 configured to obtain an original network request generated by a client for a target service, where the original network request includes target attribution information corresponding to the client, and an original domain name used to access the target service;

a second obtaining module 62 configured to obtain a first domain name rewriting rule corresponding to the target attribution information, and rewrite the original domain name by using the first domain name rewriting rule, to obtain a first domain name, where the first domain name includes a target CDN service provider identifier and a target equipment room identifier;

an update module 63 configured to update the original domain name in the original network request by using the first domain name, to obtain a target network request; and a sending module 64 configured to send the target network request to a target CDN server corresponding to the target CDN service provider identifier, so that the target CDN server obtains a target scheduling path corresponding to the target equipment room identifier, and forwards the target network request to a target equipment room according to the target scheduling path.

In the embodiment of the present disclosure, the CDN network request scheduling apparatus further includes a generation module configured to: generate a first query request based on a preset query mechanism, where the first query request carries the target attribution information of the client; send the first query request to a cloud network control system, so that the cloud network control system obtains a first domain name rewriting rule that matches the target attribution information from a plurality of domain name rewriting rules, and sends the first domain name rewriting rule to the client, where the domain name rewriting rule is generated based on a first mapping relationship between preset attribution information and an equipment room identifier, a second mapping relationship between the equipment room identifier and a domain name, and a preset traffic percentage; and receive the first domain name rewriting rule sent by the cloud network control system, and store the first domain name rewriting rule.

In the embodiment of the present disclosure, the generation module is configured to: detect whether the target attribution information is updated relative to initial attribution information, to obtain a detection result, where the initial attribution information is attribution information stored by the client before the original network request is received; and generate the first query request based on a request generation policy corresponding to the detection result.

In the embodiment of the present disclosure, the generation module is configured to: when the detection result is that the target attribution information is not updated relative to the initial attribution information, obtain a preset time interval, and generate the first query request based on the preset time interval and the target attribution information; or when the detection result is that the target attribution information is updated relative to the initial attribution information, generate the first query request based on the target attribution information.

In the embodiment of the present disclosure, the second obtaining module 62 is configured to: obtain a target equipment room identifier corresponding to the target attribution information from the first mapping relationship, and obtain a candidate domain name corresponding to the target equipment room identifier from the second mapping relationship; and obtain the preset traffic percentage, and determine a candidate domain name that matches the preset traffic percentage as the first domain name.

In the embodiment of the present disclosure, the CDN network request scheduling apparatus further includes an update module configured to: receive response information fed back from a service access layer, where the service access layer is used to forward the target network request; generate a second query request by using the target attribution information when the response information carries the target identifier, where the target identifier is used to indicate that a domain name rewriting rule corresponding to the target attribution information is updated in the cloud network control system; send the second query request to the cloud network control system, so that the cloud network control system delivers a second domain name rewriting rule corresponding to the target attribution information, where the second domain name rewriting rule is a domain name rewriting rule obtained after the first domain name rewriting rule is updated; and receive the second domain name rewriting rule, and regenerate a second domain name corresponding to the original domain name by using the second domain name rewriting rule.

Figure 7:
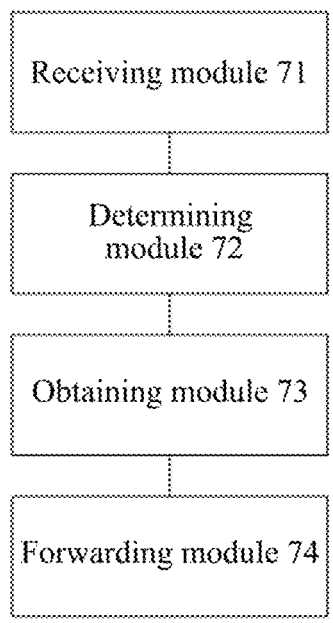
FIG. 7 is a block diagram of a CDN network request scheduling apparatus according to another embodiment of the present disclosure.

FIG. 7 is a block diagram of a CDN network request scheduling apparatus according to an embodiment of the present disclosure. The apparatus may be implemented as a part or an entirety of an electronic device by means of software, hardware, or a combination thereof. As shown in FIG. 7, the apparatus includes:
- a receiving module 71 configured to receive a target network request from a client, where the target network request includes a first domain name, and the first domain name includes a target equipment room identifier;
- a determining module 72 configured to determine a target back-to-source address corresponding to the target equipment room identifier based on a correspondence between a preset back-to-source address and an equipment room identifier;
- an obtaining module 73 configured to obtain an access path and a target equipment room that correspond to the target back-to-source address; and
- a forwarding module 74 configured to forward the target network request to the target equipment room based on the access path.

Figure 8:
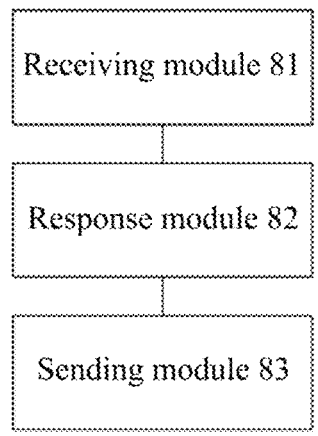
FIG. 8 is a block diagram of a CDN network request scheduling apparatus according to another embodiment of the present disclosure.

FIG. 8 is a block diagram of a CDN network request scheduling apparatus according to an embodiment of the present disclosure. The apparatus may be implemented as a part or an entirety of an electronic device by means of software, hardware, or a combination thereof. As shown in FIG. 8, the apparatus includes:
- a receiving module 81 configured to receive a query request from a client, where the query request includes target attribution information corresponding to the client;
- a response module 82 configured to obtain a first domain name rewriting rule corresponding to the target attribution information from a plurality of domain name rewriting rules in response to the query request, wherein the domain name rewriting rule is generated based on a first mapping relationship between preset attribution information and an equipment room identifier, a second mapping relationship between the equipment room identifier and a domain name, and a preset traffic percentage; and
- a sending module 83 configured to send the first domain name rewriting rule to the client, so that the client performs domain name rewriting based on the first domain name rewriting rule.

In the embodiment of the present disclosure, the CDN network request scheduling apparatus further includes an update module configured to: obtain update information acting on a domain name rewriting rule, and update the domain name rewriting rule based on the update information, to obtain an updated domain name rewriting rule; generate probe information based on the updated domain name rewriting rule, and send the probe information to a service access layer, so that when receiving a target network request sent by the client, the service access layer determines, based on the probe information, whether a domain name rewriting rule corresponding to the target attribution information of the client is updated, and delivers response information carrying a target identifier to the client when the domain name rewriting rule corresponding to the target attribution information of the client is updated; receive a second query request sent by the client, where the second query request carries the target attribution information; and obtain a second domain name rewriting rule corresponding to the target attribution information from the updated domain name rewriting rule by using the target attribution information, and send the second domain name rewriting rule to the client.

Figure 9:
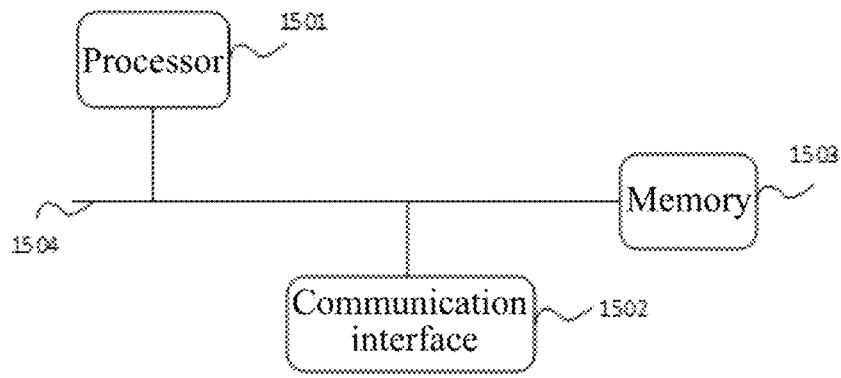
FIG. 9 is a schematic diagram of a structure of an electronic device according to an embodiment of the present disclosure.

An embodiment of the present disclosure further provides an electronic device. As shown in FIG. 9, the electronic device may include: a processor 1501, a communication interface 1502, a memory 1503, and a communication bus 1504. The processor 1501, the communication interface 1502, and the memory 1503 communicate with each other through the communication bus 1504.

The memory 1503 is configured to store a computer program.

The processor 1501 is configured to implement the steps of the above embodiments when executing the computer program stored in the memory 1503.

The communication bus mentioned in the above terminal may be a peripheral component interconnect (PCI) bus or an extended industry standard architecture (EISA) bus, etc. The communication bus may be divided into an address bus, a data bus, a control bus, etc. For ease of representation, the bus is represented by only one bold line in the figure, but this does not mean that there is only one bus or only one type of bus.

The communication interface is used for communication between the above terminal and another device.

The memory may include a random access memory (RAM). or a non-volatile memory, for example, at least one disk memory. Optionally, the memory may be at least one storage apparatus disposed far away from the above processor.

The above processor may be a general-purpose processor, including a central processing unit (CPU), a network processor (NP), etc., or may be a digital signal processor (DSP), an application specific integrated circuit (ASIC), a field programmable gate array (FPGA) or another programmable logic device, a discrete gate or transistor logic device, or a discrete hardware component.

In another embodiment of the present disclosure, a computer-readable storage medium storing instructions is further provided. The instructions, when run on a computer, cause the computer to perform the CDN network request scheduling method described in any one of the above embodiments.

In another embodiment of the present disclosure, a computer program product including instructions is further provided. The computer program product, when run on a computer, causes the computer to perform the CDN network request scheduling method described in any one of the above embodiments.

All or some of the above embodiments may be implemented by means of software, hardware, firmware, or any combination thereof. When implemented by means of software, all or some of the embodiments may be implemented in a form of the computer program product. The computer program product includes one or more computer instructions. When the computer program instructions are loaded and executed on the computer, all or some procedures or functions described in the embodiments of the present disclosure are generated. The computer may be a general-purpose computer, a dedicated computer, a computer network, or another programmable apparatus. The computer instructions may be stored in the computer-readable storage medium, or may be transmitted from one computer-readable storage medium to another computer-readable storage medium. For example, the computer instructions may be transmitted from one website, computer, or data center to another website, computer, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or may be a data storage device, such as an integrated server or a data center, that includes one or more usable media. The available medium may be a magnetic medium (for example, a floppy disk, a hard disk, or a magnetic tape), an optical medium (for example, a DVD), or a semiconductor medium (for example, a solid state disk), etc.

The above description illustrates merely preferred embodiments of the present disclosure, and is not intended to limit the scope of protection of the present disclosure. Any modifications, equivalent substitutions, improvements, etc. made within the spirit and principle of the present disclosure shall fall within the scope of protection of the present disclosure.

The above description illustrates merely specific implementations of the present disclosure, so that those skilled in the art can understand or implement the present disclosure. Various modifications to these embodiments are apparent to those skilled in the art, and the general principle defined herein may be practiced in other embodiments without departing from the spirit or scope of the present disclosure. Therefore, the present disclosure will not be limited to the embodiments shown herein, but extends to the widest scope that complies with the principles and novelty applied for herein.

The invention claimed is:

1. A content delivery network (CDN) network request scheduling method, which is applied to a client, the method comprising:
    obtaining an original network request generated by the client for a target service, wherein the original network request comprises target attribution information corresponding to the client, and an original domain name used to access the target service;
    obtaining a first domain name rewriting rule corresponding to the target attribution information, and rewriting the original domain name by using the first domain name rewriting rule, to obtain a first domain name, wherein the first domain name comprises a target CDN service provider identifier and a target equipment room identifier;
    updating the original domain name in the original network request by using the first domain name, to obtain a target network request; and
    sending the target network request to a target CDN server corresponding to the target CDN service provider identifier, so that the target CDN server obtains a target scheduling path corresponding to the target equipment room identifier, and forwards the target network request to a target equipment room according to the target scheduling path.

2. The method according to claim 1, wherein before the obtaining the first domain name rewriting rule corresponding to the target attribution information, the method further comprises:
    generating a first query request based on a preset query mechanism, wherein the first query request carries the target attribution information of the client;
    sending the first query request to a cloud network control system, so that the cloud network control system obtains the first domain name rewriting rule that matches the target attribution information from a plurality of domain name rewriting rules, and sends the first domain name rewriting rule to the client, wherein the domain name rewriting rule is generated based on a first mapping relationship between preset attribution information and an equipment room identifier, a second mapping relationship between the equipment room identifier and a domain name, and a preset traffic percentage; and receiving the first domain name rewriting rule sent by the cloud network control system, and storing the first domain name rewriting rule.

3. The method according to claim 2, wherein the generating the first query request based on the preset query mechanism comprises:

detecting whether the target attribution information is updated relative to initial attribution information, to obtain a detection result, wherein the initial attribution information is attribution information stored by the client before the original network request is received; and generating the first query request based on a request generation policy corresponding to the detection result.

4. The method according to claim 3, wherein the generating the first query request based on the request generation policy corresponding to the detection result comprises:

when the detection result is that the target attribution information is not updated relative to the initial attribution information, obtaining a preset time interval, and generating the first query request based on the preset time interval and the target attribution information;

or when the detection result is that the target attribution information is updated relative to the initial attribution information, generating the first query request based on the target attribution information.

5. The method according to claim 2, wherein the rewriting the original domain name by using the first domain name rewriting rule, to obtain the first domain name comprises:

obtaining a target equipment room identifier corresponding to the target attribution information from the first mapping relationship, and obtaining a candidate domain name corresponding to the target equipment room identifier from the second mapping relationship; and obtaining the preset traffic percentage, and determining a candidate domain name that matches the preset traffic percentage as the first domain name.

6. The method according to claim 1, wherein after the sending the target network request to the target CDN server corresponding to the first domain name, the method further comprises:

receiving response information fed back from a service access layer, wherein the service access layer is used to forward the target network request;

generating a second query request by using the target attribution information when the response information carries a target identifier, wherein the target identifier is used to indicate that a domain name rewriting rule corresponding to the target attribution information is updated in a cloud network control system;

sending the second query request to the cloud network control system, so that the cloud network control system delivers a second domain name rewriting rule corresponding to the target attribution information, wherein the second domain name rewriting rule is a domain name rewriting rule obtained after the first domain name rewriting rule is updated; and receiving the second domain name rewriting rule, and regenerating a second domain name corresponding to the original domain name by using the second domain name rewriting rule.

7. A content delivery network (CDN) network request scheduling method, which is applied to a CDN server, the method comprising:

receiving a target network request from a client, wherein the target network request comprises a first domain name, and the first domain name comprises a target equipment room identifier;

determining a target back-to-source address corresponding to the target equipment room identifier based on a correspondence between a preset back-to-source address and an equipment room identifier;

obtaining an access path and a target equipment room that correspond to the target back-to-source address; and forwarding the target network request to the target equipment room based on the access path.

8. A content delivery network (CDN) network request scheduling method, which is applied to a cloud network control system, the method comprising:

receiving a first query request from a client, wherein the first query request comprises target attribution information corresponding to the client;

obtaining a first domain name rewriting rule corresponding to the target attribution information from a plurality of domain name rewriting rules in response to the first query request, wherein the domain name rewriting rule is generated based on a first mapping relationship between preset attribution information and an equipment room identifier, a second mapping relationship between the equipment room identifier and a domain name, and a preset traffic percentage; and sending the first domain name rewriting rule to the client, so that the client performs domain name rewriting based on the first domain name rewriting rule.

9. The method according to claim 8, further comprising:

obtaining update information acting on the domain name rewriting rule, and updating the domain name rewriting rule based on the update information, to obtain an updated domain name rewriting rule;

generating probe information based on the updated domain name rewriting rule, and sending the probe information to a service access layer, so that when receiving a target network request sent by the client, the service access layer determines, based on the probe information, whether a domain name rewriting rule corresponding to the target attribution information of the client is updated, and delivers response information carrying a target identifier to the client when the domain name rewriting rule corresponding to the target attribution information of the client is updated;

receiving a second query request sent by the client, wherein the second query request carries the target attribution information; and obtaining a second domain name rewriting rule corresponding to the target attribution information from the updated domain name rewriting rule by using the target attribution information, and sending the second domain name rewriting rule to the client.

10. A non-transitory storage medium, comprising a computer program stored thereon, wherein when the computer program is run, the method according to claim 1 is performed.

11. An electronic device, comprising a processor, a communication interface, a memory, and a communication bus, wherein the processor, the communication interface, and the memory communicate with each other through the communication bus, the memory is configured to store a computer program, and the processor is configured to perform the method according to claim 1 by running the program stored in the memory.

12. The electronic device according to claim 11, wherein before the obtaining the first domain name rewriting rule corresponding to the target attribution information, the processor is further configured to:

generating a first query request based on a preset query mechanism, wherein the first query request carries the target attribution information of the client;

sending the first query request to a cloud network control system, so that the cloud network control system obtains the first domain name rewriting rule that matches the target attribution information from a plurality of domain name rewriting rules, and sends the first domain name rewriting rule to the client, wherein the domain name rewriting rule is generated based on a first mapping relationship between preset attribution information and an equipment room identifier, a second mapping relationship between the equipment room identifier and a domain name, and a preset traffic percentage; and receiving the first domain name rewriting rule sent by the cloud network control system, and storing the first domain name rewriting rule.

13. The electronic device according to claim 12, wherein the processor is configured to:

detecting whether the target attribution information is updated relative to initial attribution information, to obtain a detection result, wherein the initial attribution information is attribution information stored by the client before the original network request is received; and generating the first query request based on a request generation policy corresponding to the detection result.

14. The electronic device according to claim 13, wherein the processor is configured to:

when the detection result is that the target attribution information is not updated relative to the initial attribution information, obtaining a preset time interval, and generating the first query request based on the preset time interval and the target attribution information;

or when the detection result is that the target attribution information is updated relative to the initial attribution information, generating the first query request based on the target attribution information.

15. The electronic device according to claim 12, wherein the processor is configured to comprises:

obtaining a target equipment room identifier corresponding to the target attribution information from the first mapping relationship, and obtaining a candidate domain name corresponding to the target equipment room identifier from the second mapping relationship; and obtaining the preset traffic percentage, and determining a candidate domain name that matches the preset traffic percentage as the first domain name.

16. The electronic device according to claim 11, wherein after the sending the target network request to the target CDN server corresponding to the first domain name, the processor is configured to:

receiving response information fed back from a service access layer, wherein the service access layer is used to forward the target network request;

generating a second query request by using the target attribution information when the response information carries a target identifier, wherein the target identifier is used to indicate that a domain name rewriting rule corresponding to the target attribution information is updated in a cloud network control system;

sending the second query request to the cloud network control system, so that the cloud network control system delivers a second domain name rewriting rule corresponding to the target attribution information, wherein the second domain name rewriting rule is a domain name rewriting rule obtained after the first domain name rewriting rule is updated; and receiving the second domain name rewriting rule, and regenerating a second domain name corresponding to the original domain name by using the second domain name rewriting rule.

17. A non-transitory storage medium, comprising a computer program stored thereon, wherein when the computer program is run, the method according to claim 7 is performed.

18. An electronic device, comprising a processor, a communication interface, a memory, and a communication bus, wherein the processor, the communication interface, and the memory communicate with each other through the communication bus, the memory is configured to store a computer program, and the processor is configured to perform the method according to claim 7 by running the program stored in the memory.

19. A non-transitory storage medium, comprising a computer program stored thereon, wherein when the computer program is run, the method according to claim 8 is performed.

20. An electronic device, comprising a processor, a communication interface, a memory, and a communication bus, wherein the processor, the communication interface, and the memory communicate with each other through the communication bus, the memory is configured to store a computer program, and the processor is configured to perform the method according to claim 8 by running the program stored in the memory.

* * * * *